US011809280B2

(12) United States Patent  
Chopra et al.

(10) Patent No.: US 11,809,280 B2  
(45) Date of Patent: Nov. 7, 2023

(54) SYNCHRONIZING EXPIRATIONS FOR INCREMENTAL BACKUP DATA STORED ON A CLOUD-BASED OBJECT STORAGE

(71) Applicant: EMC IP Holding Company LLC, Hopkinton, MA (US)

(72) Inventors: Shelesh Chopra, Bangalore (IN); Sunil Yadav, Bangalore (IN); Amarendra Behera, Bangalore (IN); Ravi Vijayakumar Chitloor, Bengaluru (IN); Tushar Dethe, Bangalore (IN); Himanshu Arora, Bangalore (IN); Prabhat Kumar Dubey, Chikkanagamangala (IN); Jigar Bhanushali, Bengaluru (IN); Deependra Singh, Kanpur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 17/193,919

(22) Filed: Mar. 5, 2021

(65) Prior Publication Data

US 2022/0283904 A1 Sep. 8, 2022

(51) Int. Cl.  
*G06F 11/14* (2006.01)

(52) U.S. Cl.  
CPC ...... *G06F 11/1451* (2013.01); *G06F 11/1461* (2013.01); *G06F 11/1464* (2013.01); *G06F 2201/80* (2013.01)

(58) Field of Classification Search  
CPC ............. G06F 11/1451; G06F 11/1461; G06F 11/1464; G06F 2201/80  
USPC ........................................................ 711/162  
See application file for complete search history.

(56) References Cited

U.S. PATENT DOCUMENTS

| | | | |
|---|---|---|---|
| 9,235,606 B1 * | 1/2016 | Mooney ................ G06F 16/21 |
| 2017/0132086 A1 * | 5/2017 | Blackburn .......... G06F 11/1466 |
| 2019/0332488 A1 * | 10/2019 | Bono .................. H04L 67/1097 |
| 2020/0351347 A1 * | 11/2020 | Chang ................ G06F 11/1461 |

* cited by examiner

*Primary Examiner* — Gautam Sain  
*Assistant Examiner* — Wei Ma  
(74) *Attorney, Agent, or Firm* — Dergosits & Noah LLP; Todd A. Noah

(57) ABSTRACT

Described is a system for synchronizing expiration times for incremental backup data stored on a cloud-based object storage. More particularly, the system may provide a layer of intelligence when updating the expiration times associated with backup data to ensure that a full recovery of the client data to a point-in-time of any incremental backup may be performed. To provide such a capability, the system may maintain specialized metadata identifying expiration times for objects and a list of objects required to perform a full recovery to a point-in-time for each of the performed backups (e.g. full or incremental). The system may access this metadata to identify which objects stored by a previous backup are still referenced by a subsequent backup. Based on the identified objects, the system may synchronize object expiration times to ensure objects are not prematurely deleted from the object storage.

20 Claims, 6 Drawing Sheets

500

| 501 | Perform a first backup of client data stored on a client device at a first point-in-time to a cloud-based object storage, the first backup including storing the client data within a first set of objects on the object storage |

| 502 | Perform a second backup of the client data stored on the client device at a second point-in-time, the client data including at least some of the client data already stored within the first set objects and new client data, the second backup including storing the new client data within a second set of objects on the object storage |

| 503 | Identify, amongst the first set of objects, a third set of objects storing at least a portion of the client data already stored |

| 504 | Determine whether a first expiration time specified by metadata associated with the third set of objects is prior to a second expiration time specified by metadata associated with the second set of objects |

| 505 | Update the metadata associated with the third set of objects from the first expiration time to the second expiration time, in response to determining the first expiration time is prior to the second expiration time |

FIG. 5

SYNCHRONIZING EXPIRATIONS FOR INCREMENTAL BACKUP DATA STORED ON A CLOUD-BASED OBJECT STORAGE

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. As part of the data protection and recovery infrastructure, clients may rely on third-party cloud-based storages to leverage the benefits associated with such systems (or services) such as cost efficiency (e.g. pay-per-use model) and scalability. These cloud-based storages may implement an object-based storage architecture, and accordingly, client data such as backup data may be stored as objects (or data objects). To limit the amount of data transferred during a backup procedure, the client data may be stored to an object storage using incremental backups. For example, only the changes to the client data since the previous backup will be stored as part of the incremental backup. Accordingly, backup data from previous backups may need to be preserved on the object storage to perform a full data recovery. However, managing and tracking data relationships between different backups becomes increasingly difficult. For example, as part of a data management policy, backup data may expire thereby freeing up storage space on the object storage to reduce storage costs. The native expiration management tools provided by the object storage, however, may not adequately account for backup data being stored as part of an incremental backup infrastructure. As a result, there exists the potential for backup data to be removed prematurely from the object storage such that the ability to perform a full recovery from the incremental backup data may be jeopardized. Accordingly, there is a continued need to efficiently manage incremental backup data stored on a cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 5 is a process flow diagram illustrating an example method of updating expiration times of objects storing backup data according to one or more embodiments of the disclosure.

DETAILED DESCRIPTION

Figure 1:
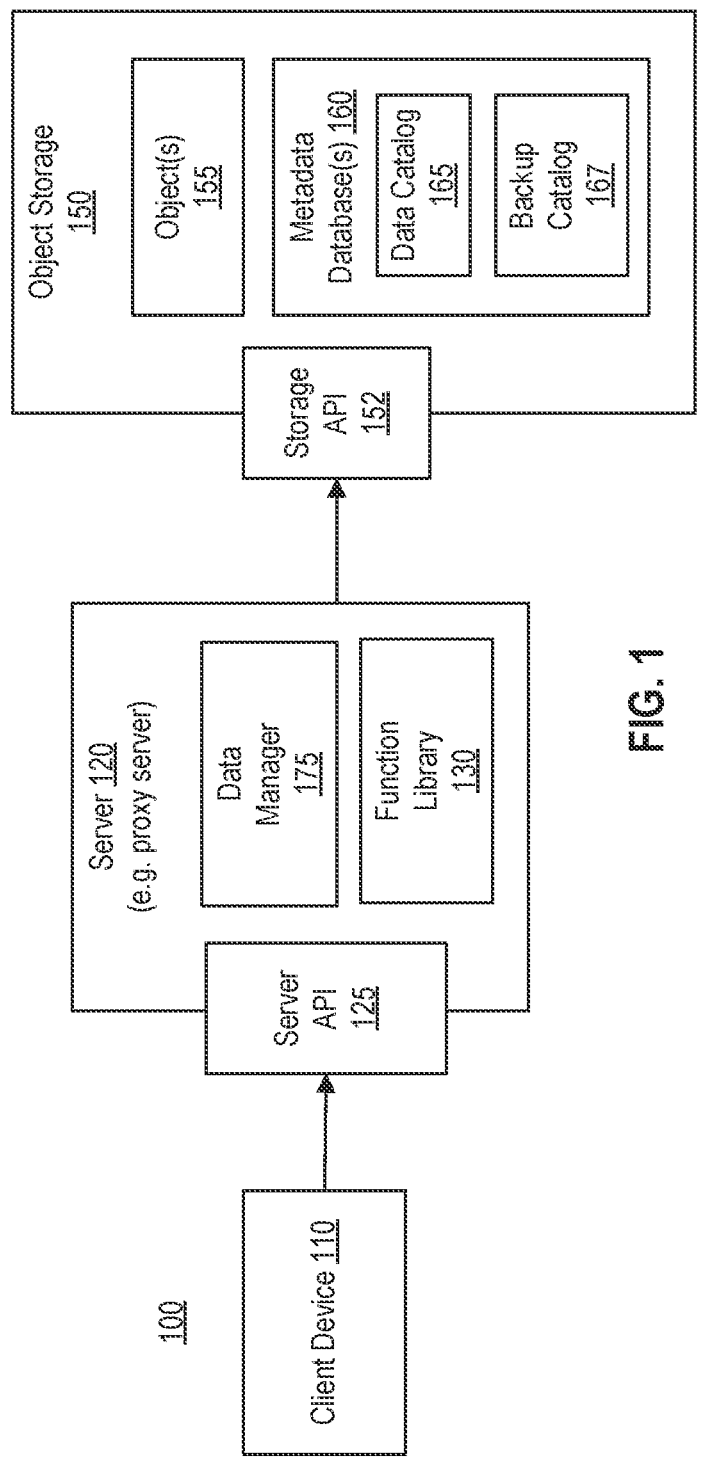
FIG. 1 is a block diagram illustrating an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for synchronizing expiration times for incremental backup data stored on a cloud-based object storage. More particularly, the system may provide a layer of intelligence when updating the expiration times associated with backup data to ensure that a full recovery of client data may be performed when storing backup data incrementally. In some embodiments, the system may include a server (or gateway) that provides a backup service to a client device. For example, as part of a data management policy, a backup service may incrementally backup client data to the cloud-based object storage. However, the backup application may be configured to perform a full recovery of the client data to a point-in-time of any incremental backup by reconstructing (e.g. synthetically) the client data as if a full backup was performed. Accordingly, instead of merely relying on native expiration management tools provided by a cloud-based object storage, the system may synchronize object expiration times based on whether a particular object is still referenced. Accordingly, the system may provide a layer of intelligence when updating object expiration times while still preserving efficient backup storage techniques.

To provide such a capability, the system may maintain specialized metadata. The metadata may include information identifying expiration times for individual objects and information indicating a list of objects required to perform a full recovery to a point-in-time for each of the backups performed (e.g. full or incremental). Accordingly, the system may leverage this information to synchronize expiration times for particular objects. For example, the system may access a metadata database to identify which objects stored by a previous backup are still referenced by a subsequent backup. Based on the identified objects, the system may synchronize the expiration times for the referenced objects with the objects of a particular backup. This may ensure that objects are not removed (e.g. deleted) from the object storage prematurely and that a full recovery of the client data to a point-in-time of any incremental backup may be performed.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 (or client data stored by the client device 110) may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. Accordingly, the client device 110 may be a source of client data to be backed up to the object storage 150. In some embodiments, the client data may include data items. For example, the data items may include emails. In some embodiments, the client device 110 may include, or work in conjunction with, a cloud-based component (e.g. server) that manages client data. For example, the client device 110 may include a server (e.g. email server) that manages client data as part of a cloud-based service (e.g. cloud-based email service).

The object storage (or object storage system) 150 may include a persistent object storage that implements a storage architecture that manages data as an object(s) 155. For example, each object 155 stored by the object storage 150 may include data, meta-data, and/or a globally unique identifier for the object. In some embodiments, an object 155 may include a unit of storage used by a cloud-based object storage and may include a collection of objects that may be referred to as containers, buckets, and the like (e.g. depending on the cloud-based storage provider). In some embodiments, the object storage 150 may include various storage tiers (not shown). Accordingly, objects 155 (e.g. backed-up client data) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs.

As described, the server 120 may act as an intermediary for managing client backup data stored on the object storage 150. In some embodiments, the server 120 may include, or work in conjunction with, various backup components (e.g. products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. For example, the server 120 may update expiration times associated with objects 155 via a storage API 152. For example, the server 120 may call an update data function provided by the storage API 152 to update expiration times associated with objects 155. It should be noted that the same set of operations provided by the server API 125 may be used by the client device 110 irrespective of the type of object storage 150 (e.g. object storage provider). To provide such object-storage-agnostic functionality, the server 120 may include a function library 130 that includes object-storage-specific (or provider-specific) functions. In other words, the function library 130 may include a specific set of functions that are configured to interact with a particular object storage (e.g. object storage provider). Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations. Accordingly, the server 120 may implement efficient storage and recovery procedures as further described herein.

As described, the server 120 may manage backed up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing expiration times. For example, the user interface may allow a user to configure (e.g. input) various settings such as a default expiration time for an object 155 (or backup data stored therein). In addition, the data manager 175 may direct (or control, initiate, etc.) other components of the operating environment 100 to perform various processes as further described herein.

To further improve potential storage and recovery efficiency, the server 120 may leverage a specialized metadata database 160. The metadata database 160 may be maintained by the server 120. The metadata database 160 may be an embedded database. For example, the metadata database 160 may be created by the server 120 using a particular software library (e.g. SQLite library). The metadata database 160 may reside on the object storage 150, the server 120, and/or another component (e.g. cloud-based component) such that it is accessible by the server 120. For example, when the metadata database 160 resides on the object storage 150, the server 120 may access (e.g. update) the metadata database 160 by accessing the storage API 152.

The metadata database 160 may store metadata associated with client data stored on the client device 110 and/or backed up to the object storage 150. The metadata database 160 may also store various types of backup information associated with the backed-up client data.

For example, the metadata database 160 may include a data catalog (or table, database, index, etc.) 165. The data (or object) catalog 165 may store information associated with the objects 155 and/or data items (e.g. emails) stored as part of each backup. The data catalog 165 may store various types of backup information associated with the backed-up client data as further described herein. For example, the metadata associated with objects (e.g. object/data metadata) may include a point-in-time the client data was backed up, an expiration time, a storage location of the backed-up client data, an object ID to which the backed-up client data is stored, and various other types of information.

In some embodiments, the data catalog 165 may be maintained for a particular account (or sub-account) associated with a client. For example, a data catalog 165 may be maintained for each email account (or user, mailbox, address, etc.). Accordingly, in such embodiments, a data catalog 165 (or instance thereof) may be updated after each backup is performed. In some embodiments, the client data may be in the form of a data item such as a file (or data file). Accordingly, the metadata stored as part of the data catalog 165 may also be stored as part of such files that are backed up to the object storage. For example, the data items may include client emails that are stored as email files on the client device 110. These client emails may also store certain metadata (or properties) associated with each email. Accordingly, such metadata (or properties) may be stored as part of the data catalog 165. For example, as part of a backup, this metadata may be obtained from the client device (or associated API) 110, extracted from the data items to be backed up, or obtained from another source such as a database maintained by the client device 110. Such metadata may then be stored to the data catalog 165. Accordingly, the data catalog 165 may then be searched to obtain information about the backed-up client data rather than having to search the contents of the objects 155 that store the backed-up client emails/files. The metadata may also include any information (e.g. properties) that may be associated with data or a file. For example, the metadata may include information related to a time (e.g. last accessed time, last modified time, creation time, etc.) associated with the data, author, importance, read-only, storage location, etc. In some embodiments, the client data may include emails, and the metadata associated with emails may include a subject, sender, recipient(s), sent time, whether the email was sent with attachments, whether the email is live, whether the email is read/unread, whether the email is flagged by a user, marked as important or urgent, a priority level, a due date or deadline, a meeting time, and any other properties that may be associated with an email.

The metadata database 160 may also include a backup catalog (or index, table, database, etc.) 167 that stores information associated with each backup performed to the object storage 150. For example, the metadata associated with a backup (e.g. backup metadata) may include backup times specifying when each backup was performed, a type of backup (e.g. full or incremental), a list of objects required to perform a full restore to a corresponding backup, and any other information that may be associated with performing a backup.

Accordingly, the metadata database 160 may be leveraged by the server 120 when synchronizing expiration times as further described herein.

Figure 2:
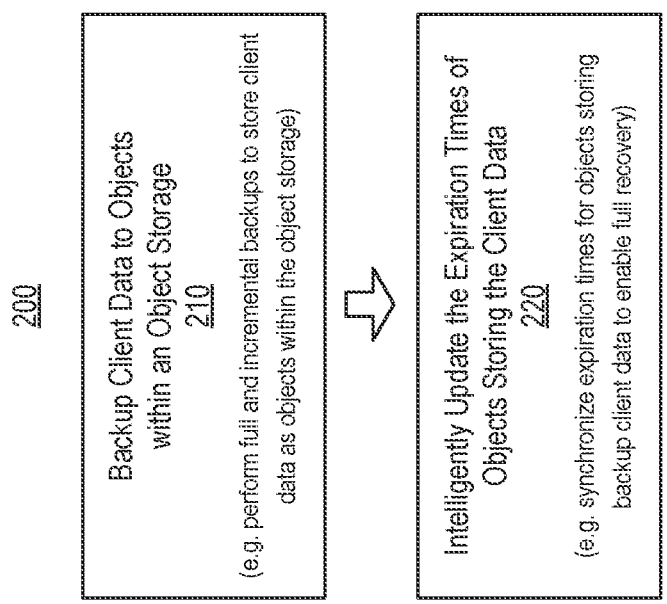
FIG. 2 is a block diagram illustrating a general overview for updating expiration times associated with backup data according to one or more embodiments of the disclosure.

FIG. 2 is a process flow diagram 200 illustrating a general overview for updating expiration times associated with backup data stored on an object storage according to one or more embodiments of the disclosure.

In 210, a server (e.g. server 120) may backup client data stored on a client device (e.g. client device 110) to objects (e.g. objects 155) within an object storage (e.g. object storage 150). The server may perform backups of client data in response to receiving a request to perform a backup of the client data. For example, the request may be from a user (e.g. backup administrator) or from a backup application (e.g. as part of a scheduled backup procedure). When performing a backup, the server may store a backup of the client data on the object storage as one or more objects (e.g. objects 155). When storing these objects, the server may store specialized metadata associated with the performed backup and/or client data within a metadata database (e.g. metadata database 160). When performing a backup, the server may perform either a full backup or an incremental backup. A full backup may include the server storing all of the client data at a particular point-in-time to the object storage. For example, the system may determine that the client data has not been previously backed up, and accordingly, may initiate the full backup. As another example, the server may determine that a full backup, to be performed intermittently between incremental backups, is scheduled to be performed. An incremental backup (also referred to as a differential incremental backup) may include storing only the changes to the client data since the previous backup. For example, the server may determine the changes (or delta) to client data between the point-in-time of the previous backup (e.g. full or incremental backup) and the point-in-time of the current backup. As part of the incremental backup, the server may store the new data within one or more new objects on the object storage and retain the previously backed up data within the objects already stored on the object storage. In addition, as part of the incremental backup, the server may store metadata associated with the backup and/or new data within the metadata database.

As part of the overall data management infrastructure, the server may synchronize the expiration of backed-up client data to ensure that client data required to perform a full recovery is retained by the object storage. More specifically, in 220, the server may intelligently update the expiration times of objects storing the client data. In particular, the server may update the expiration time for particular objects when certain conditions are satisfied. For example, these conditions may include whether an object is referenced by a particular backup. Accordingly, to perform such updates, the server may store specialized metadata and identify objects for expiration synchronization in a specialized manner as further described with reference to FIG. 3.

Figure 3:
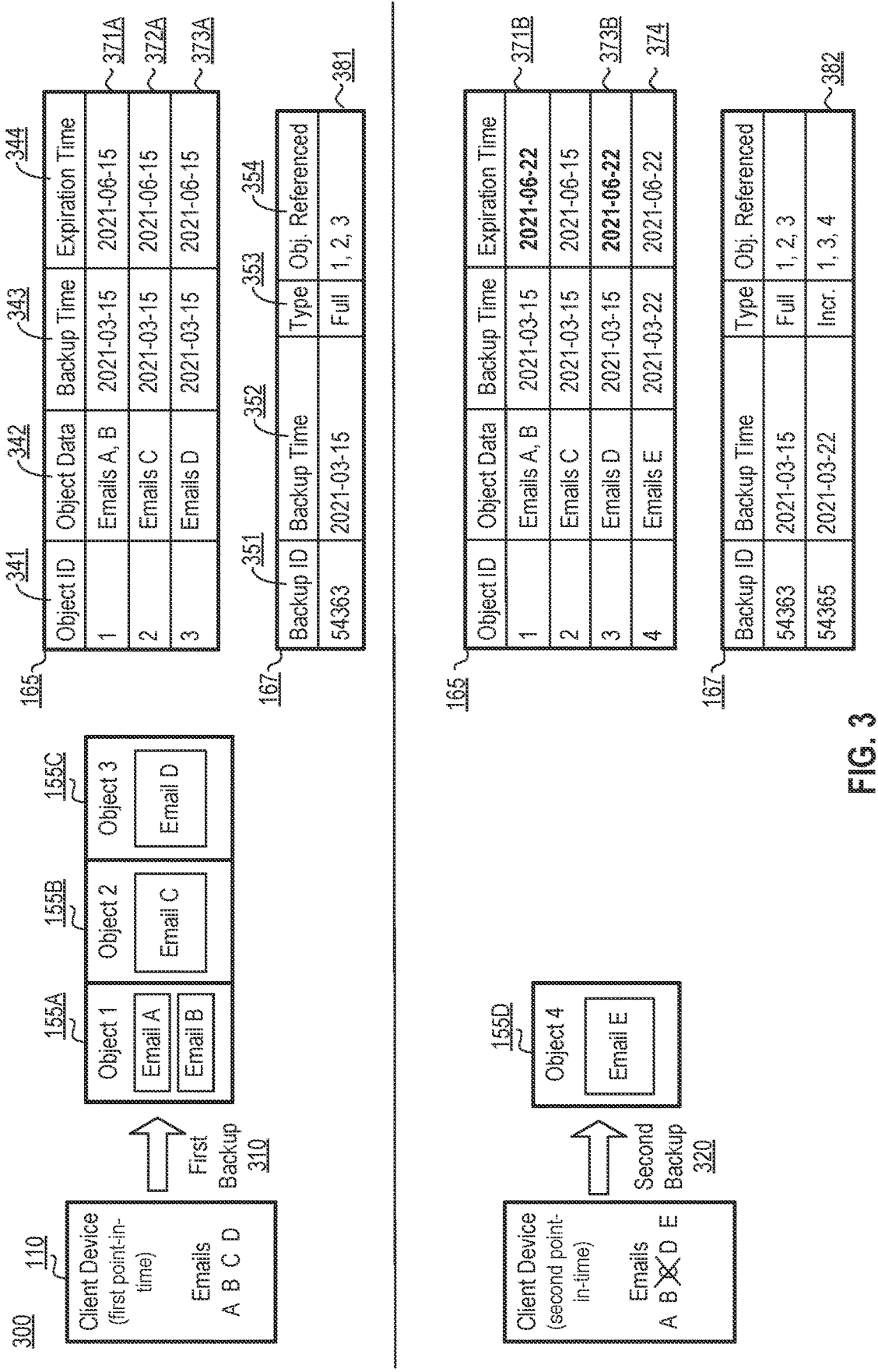
FIG. 3 is a diagram illustrating an example data configuration when updating expiration times for backup data stored on an object storage according to one or more embodiments of the disclosure.

FIG. 3 is a diagram 300 illustrating a data configuration when updating expiration times for backup data stored on an object storage according to one or more embodiments of the disclosure. More particularly, diagram 300 shows an example data configuration including storing backup data within one or more objects 155 and metadata within a data catalog 165 and backup catalog 167. In this example, the client data includes emails although any type of data is contemplated. As shown, the client device 110 at a first point-in-time stores emails A, B, C, and D. Accordingly, as part of the first backup 310, which in this example is a full backup, the server stores the emails within newly created objects 155A, 155B, and 155C of the object storage. In other words, objects 155A, 155B, and 155C may be associated with the first backup 310 and/or the first point-in-time. In some embodiments, each object 155 may be configured to store a certain amount of data that is specialized for the type of data to be backed up. For example, each of the objects 155 may be configured to store an amount of data that is specialized for client emails (e.g. approximately 4 MB). Accordingly, to efficiently utilize storage space on the object storage, the server may perform a packing (or grouping, combining, etc.) of data based on the amount of data an object 155 is configured to store. Thus, in this example, the server may attempt to pack emails into each of the objects 155 such that each object stores approximately 4 MB of data. For example, the server may store (e.g. pack) emails A and B, which are approximately 2 MB each in size, within object 155A, and emails C and D, which are approximately 4 MB each in size, within objects 155B and object 155C respectively.

As shown, the server may store metadata associated with each object. For example, metadata associated with each object may be stored as part of a data (or object) catalog 165. In addition, the metadata may include information associated with each backup. For example, metadata associated with each backup may be stored as part of a backup catalog 167. In some embodiments, all of this metadata may be stored within a metadata database (e.g. metadata database 160).

As shown, the data catalog 165 may store various types of information including an object identifier (ID) 341, object data 342, a backup time 343, and an expiration time 344. The object ID 341 may uniquely identify an object storing client backup data. The object data 342 may identify the client backup data (e.g. emails in this example) stored in the corresponding object. The backup time 343 may identify the time at which the client backup data was initially stored in the corresponding object. For example, the backup time may correspond to the point-in-time the client backup data was backed up from the client device. The expiration time 344, which may be user-configurable, may indicate when the corresponding object is deemed expired. For example, the expiration time 344 may identify the time at which the corresponding object may be removed from the object storage. For example, upon expiration of an object, a removal may include the object being deleted from the object storage. As another example, upon expiration of an object, the removal may include moving the object to a different storage tier (e.g. archival storage tier). In other words, removal of an object may include operations intended to free up storage space on the object storage to reduce potential storage costs incurred by a client. In some embodiments, the expiration time 344 may be based on the backup time 343. In some embodiments, the expiration time 344 may be a default expiration time. For example, the expiration time 344 may be 3 months from the backup time 343.

As shown, the backup catalog 167 may include a backup identifier (ID) 351, a backup time 352, a backup type 353, and a referenced object list 354. The backup ID 351 may uniquely identify the performed backup. In some embodiments, the backup ID 351 may be linked to (or referenced by, associated with, etc.) entries in the data catalog 165, For example, the backup ID 351 "54363" corresponds to the first backup 310, and thus, may be liked to entries 371-373 of the data catalog 165. As another example, entries within the backup catalog 167 may be linked with entries within the data catalog 165 based on the respective backup times 343 and 352. The backup time 352 may be a time associated with the performed backup. For example, the backup time 352 may be a point-in-time of when the backup was performed. The backup type 353 may indicate whether the backup performed was a full or incremental backup. The referenced object list 354 may include a list of objects referenced by a particular backup. For example, the objects referenced by a particular backup indicate which objects are required to perform a full recovery to the point-in-time of the corresponding backup. For example, the server may update the backup catalog 167 in response to each backup performed.

Returning to the example shown, in response to performing the first backup 310, the server may update the data catalog 165. More specifically, as shown, the server may store (or add, create, update, etc.) entries 371A-373A within the data catalog 165 that correspond to objects 1, 2, and 3 (e.g. objects 155A, 155B, and 155C respectively). Entry 371A corresponds to object 1, and as shown, identifies object 1 as the object ID 341, identifies emails A, and B as the object data 342, identifies 2021-03-15 as the backup time 343, and identifies 2021-06-15 as the expiration time 344 (e.g. 3 months from the backup time 343). In a similar manner, entries 372A, and 373A correspond to objects 2, and 3 respectively, and as shown, identify objects 2, and 3 respectively as the object IDs 341, identify emails C, and D respectively as the object data 342, identify 2021-03-15 as the backup times 343, and identify 2021-06-15 as the expiration times 344.

In addition, in response to performing the first backup 310, the server may also update the backup catalog 167. More specifically, as shown, the server may update the backup catalog 167 to include (or add, create, etc.) entry 381, which is associated with the first backup 310. As shown, entry 381 includes a unique identifier "54363" as the backup ID 351, 2021-03-15 as the backup time 352, a full backup as the type of backup 353, and objects 1, 2, and 3 (e.g. objects 155A, 155B, and 155C respectively) as the referenced object list 354. In other words, to perform a full recovery of the client data to the point-in-time associated with the first backup 310 (e.g. the restoration of emails A, B, C, and D), the referenced object list 354 indicates that the server would need to retrieve the data stored in objects 1, 2, and 3.

After the first backup 310, the server may perform a second backup 320. In this example, since the first point-in-time, the changes to the emails stored by the client device 110 include the deletion of email C, and the addition of new email E. Accordingly, the client device 110 at a second point-in-time stores emails A, B, D, and new email E. Thus, as part of the second backup 320, which in this example is an incremental backup, the server may store only new email E within newly created object 4 155D. As shown, object 4 155D only stores email E, and the previously backed up emails (e.g. emails A-D) are retained within objects 1, 2, and 3 (e.g. objects 155A, 155B, and 155C respectively). In other words, the data of objects 1, 2, and 3 are not copied to additional objects (e.g. object 4 155D) as part of the second backup 320. Instead, when a full recovery to the second point-in-time is required, the server may combine the data of the referenced objects to create a complete dataset (e.g. emails A, B, D, and E).

Accordingly, in response to performing the second backup 320, the server may update the data catalog 165. More specifically, as shown, the server may add entry 374 that corresponds to new object 4 (e.g. object 155D) within the data catalog 165. Entry 374 corresponds to object 4, and as shown, identifies object 4 as the object ID 341, identifies new email E as the object data 342, identifies 2021-03-22 as the backup time 343, and identifies 2021-06-22 as the expiration time 344 (e.g. 3 months from the backup time 343). In other words, the backup time 343 may correspond to the second point-in-time, and the expiration time 344 may be based on the point-in-time of the corresponding the backup and/or backup time 343. As shown, the expiration time 344 for entry 374 that corresponds to object 4 (e.g. 2021-06-22) is different than the initial expiration times 344 for entries 371A, 372A, and 373A that correspond to objects 1-3 (e.g. 2021-06-15). The expiration times 344 are different because objects 1-3 were stored as part of a different backup (e.g. first backup 310) than object 4 (e.g. second backup 320). Accordingly, there is a possibility that objects 1-3 may expire before object 4. In such a scenario, the system may not be able recover the emails stored in objects 1-3, for example, if a full recovery to the second point-in-time were required between 2021-06-16 and 2021-06-22 because objects 1-3 would have been removed from the object storage. To prevent such a scenario, the expiration times 344 of objects 1-3 would need to be synchronized with the expiration times 344 of object 4 as further discussed below.

Continuing with the storage of metadata, in response to performing the second backup 320, the server may also update the backup catalog 167 to include entry 382, which is associated with the second backup 320. As shown, entry 382 includes a unique identifier "54365" as the backup ID 351, 2021-03-22 as the backup time 352, an incremental backup as the type of backup 353, and objects 1, 3, and 4 (e.g. objects 155A, 155C, and 155D) as the referenced object list 354. In other words, to perform a full recovery of the client data to the point-in-time associated with the second backup 320 (e.g. restoration of emails A, B, D, and E), the referenced object list 354 indicates that the server would need to retrieve the data stored in objects 1, 3, and 4 (e.g. objects 155A, 155C, and 155D). Note that object 2 (e.g. object 155B) is not part of the referenced object list 354 because object 2 stores email C, which has since been deleted, and thus, not required for a full recovery to the second point-in-time.

As described, the server may perform a synchronization of expiration times 344. When determining which expiration times 344 to update, the server may determine whether a particular backup references objects stored as part of a previous backup. The server may perform such a determination by retrieving the referenced object list 354 for a particular backup. In this example, the second backup 320 references objects 1, and 3, stored as part of the first backup 310, in addition to object 4 stored as part of the second backup 320. In other words, in order to perform a full recovery to the second point-in-time, the server would need to retrieve the data from objects 1 and 3, in addition to the data from object 4. Accordingly, because objects 1, and 3 have a different expiration time 344 than object 4, the server may synchronize the corresponding expiration times 344. More specifically, the server would update the expiration times 344 for objects 1 and 3 to match the expiration time 344 of object 4. The server may perform such a synchronization by updating the corresponding entries for objects 1, and 3 within the data catalog 165. Accordingly, as shown, the expiration times 344 of previous entries 371A, and 373A would be updated from 2021-06-15 to 2021-06-22 as shown in entries 371B, and 373B respectively. Objects 1, and 3 now expire at the same time as object 4. As a result, the expiration times 344 for all of the objects (e.g. objects, 1, 3, and 4) referenced by the second backup 320 are synchronized (e.g. the same). Thus, the server may ensure that objects required to perform a full recovery to the second point-in-time are not prematurely removed from the object storage.

In some embodiments, the server may store certain changes to client data exclusively within the metadata database (e.g. data catalog 165 and/or backup catalog 167). In other words, certain changes to client data may be stored only within the metadata database and not within an object. For example, if the properties (or metadata) of client data have changed since the last backup, the server may store only the changes within the metadata database for further storage conservation. For instance, when an email has been deleted, the server may track (or record) the deletion within the metadata database and retain the email within the original object. For instance, in this example, in response to the second backup 320, the server may update the data catalog 165 to indicate that email C has been deleted. As another example, when only an email property (e.g. read/unread, flag, priority, due date, meeting time, etc.) has changed since the last backup, the server may track (or record) the change exclusively within the metadata database and retain the original email properties stored in the object. Accordingly, the server may incorporate any changes to the email properties at the time of recovery by relying on the information stored within the metadata database.

It should be noted that the server may copy or create a new instance of a catalog (e.g. data catalog 165 and/or backup catalog 167) from the previous backup and update the entries as necessary. Accordingly, each backup (e.g. full or incremental) may be associated with a particular version or instance of the catalog. Alternatively, during each backup (e.g. full or incremental), the server may add entries (e.g. cumulatively) to a single instance of the catalog. It should also be noted that catalogs may include one or more data structures (e.g. tables) that are linked together. In addition, it should be noted that although the data catalog 165 and backup catalog 167 are shown in the form of a table, any data structure or configuration is contemplated. In addition, the data catalog 165 and backup catalog 167 may be part of the same database (e.g. table) or separate databases (e.g. tables) that are linked.

Figure 4:
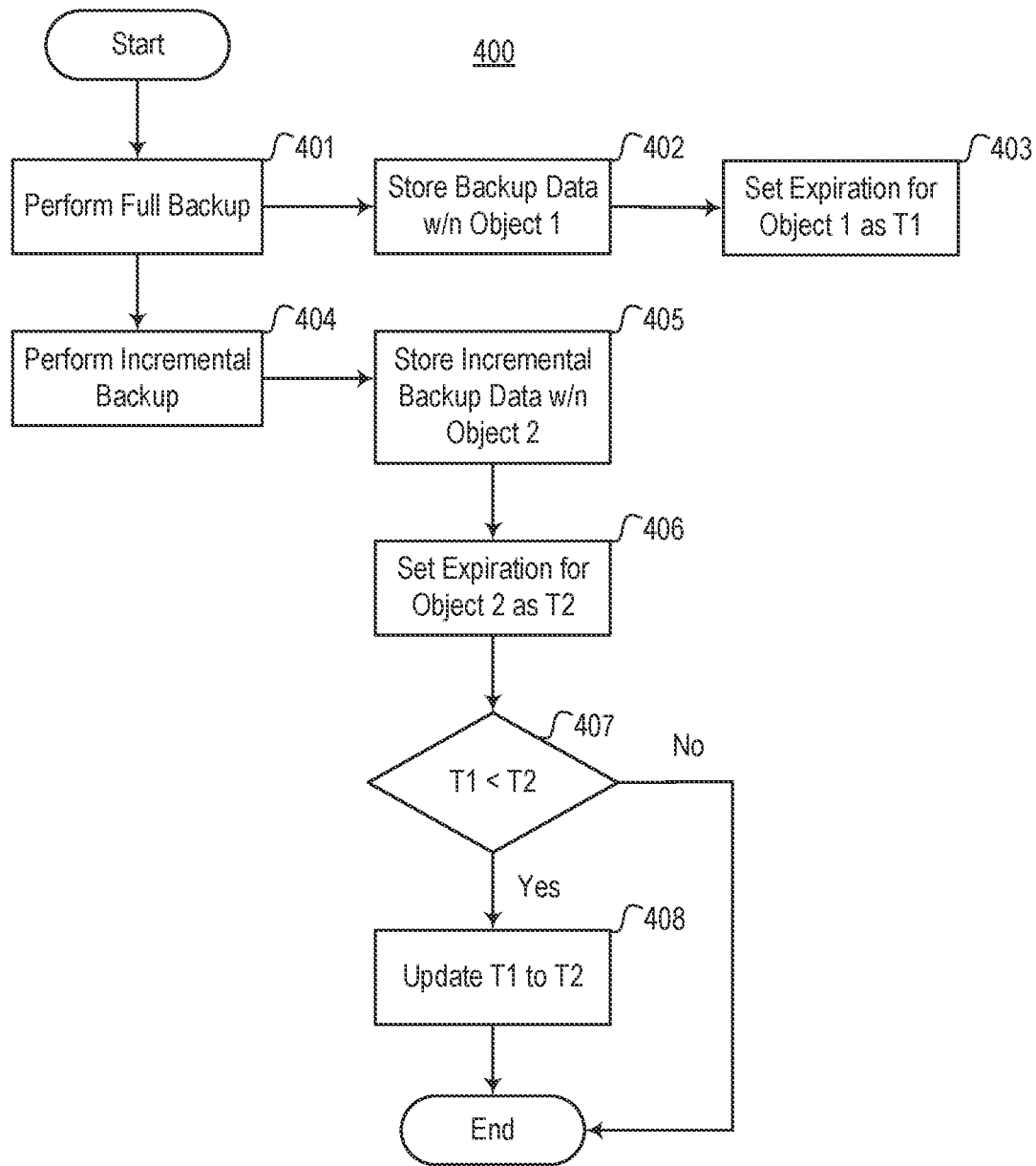
FIG. 4 is a flow diagram illustrating a process for synchronizing expiration times for objects storing backup data according to one or more embodiments of the disclosure.

FIG. 4 is a flow diagram illustrating an example process for synchronizing expiration times for objects storing backup data according to one or more embodiments of the disclosure. Process 400 may use processing logic, which may include software, hardware, or a combination thereof. For example, process 400 may be performed by a system including one or more components described in operating environment 100 (e.g. server 120, data manager 175, etc.).

As shown, after starting the process, in 401, the system may perform a full backup. Accordingly, in 402, the system may store backup data within object 1. In response to storing the backup data within object 1, in 403, an expiration for object 1 may be set as T1. The initial expiration (e.g. expiration time 344) for objects may be set by the object storage, for example, as a default setting. Alternatively, the initial expiration time for objects may be set by the system. As described, the system may maintain metadata associated with objects such as the expiration time. For example, the expiration time may be stored as part of a data catalog (e.g. data catalog 165). Next, in 404, the system may perform an incremental backup. Accordingly, in 405, the system may store incremental backup data within object 2. In response to storing the incremental backup data within object 2, in 406, an expiration for object 2 may be set as T2. As described, the expiration may be set by the object storage or the system. Next, in 407, the system may determine whether the expiration times for object 1 and object 2 require synchronization. In particular, the system may determine if T1 is an expiration time prior to T2 (e.g. T1<T2). If the expiration time of T1 is not prior to T2, the system does not need to synchronize the expiration times and the process may end. Otherwise, if the expiration time of T1 is prior to T2, in 408, the system may synchronize the expiration times by updating T1 to T2. The process may then end after synchronization. It should be noted that synchronization may include updating T1 such that it does not expire before T2 (e.g. T1 expires at the same time or after T2).

FIG. 5 is a flow diagram illustrating an example method of updating expiration times of objects storing backup data according to one or more embodiments of the disclosure. Process 500 may use processing logic, which may include software, hardware, or a combination thereof. For example, process 500 may be performed by a system including one or more components described in operating environment 100 (e.g. server 120, data manager 175, etc.).

In 501, the system (e.g. server 120) may perform a first backup (e.g. first backup 310) of client data stored on a client device (e.g. client device 110) at a first point-in-time to a cloud-based object storage (e.g. object storage 150). The first backup may include storing the client data within a first set of objects on the object storage (e.g. objects 1 155A, 2 155B, and 3 155C). In some embodiments, the first backup includes a full backup of the client data stored on the client device at the first point-in-time.

In some embodiments, in response to performing the first backup, the system may store metadata. The metadata may include metadata associated with the objects (e.g. object/data metadata). In some embodiments, this metadata may be stored as part of the data catalog (data catalog 165). Accordingly, in some embodiments, the system may store, in response to performing the first backup, metadata associated with the first set of objects (including a third set of objects that are a subset of the first set objects) as part of a metadata database (e.g. metadata database 160) on the object storage. In addition, the metadata may also include metadata associated with the backup (e.g. backup metadata). This metadata may be stored as part of a backup catalog (e.g. backup catalog 167). Accordingly, in some embodiments, the system may store, in response to performing the first backup, metadata associated with the first backup including a first list of objects required to perform a full recovery of the client data to the first point-in-time (e.g. referenced object list 354 of entry 381). For example, the first list may include the first set of objects (e.g. objects 1 155A, 2 155B, and 3 155C).

In 502, the system may perform a second backup (e.g. second backup 320) of the client data stored on the client device at a second point-in-time to the object storage. The client data stored on the client device at the second point-in-time may include at least some of the client data (e.g. emails A, B, and D as shown in diagram 300) already stored within the first set objects and new client data (e.g. email E as shown in diagram 300) stored on the client device since the first point-in-time. The second backup may include storing the new client data within a second set of objects on the object storage (e.g. object 4 155D). In some embodiments, the second backup includes an incremental backup of the client data stored on the client device from the first point-in-time to the second point-in-time.

As described, in response to performing the second backup the system may store metadata. In some embodiments, the system may store, in response to performing the second backup, metadata associated with the second set of objects as part of the metadata database. In addition, in some embodiments, the system may store, in response to performing the second backup, metadata associated with the second backup including a second list of objects required to perform a full recovery of the client data to the second point-in-time (e.g. referenced object list 354 of entry 382). For example, the second list may include the second set of objects (e.g. object 4 155D) and a third set of objects (e.g. objects 1 155A, and 3 155C). As described, in some embodiments, the metadata associated with the first backup and the metadata associated with the second backup are stored as part of a backup catalog on the object storage.

In 503, the system may identify, amongst the first set of objects, a third set of objects (e.g. objects 1 155A, and 3 155C) storing at least a portion of the client data already stored (e.g. as part of the first backup). In some embodiments, such an identifying includes accessing the backup catalog to obtain the second list of objects required to perform the full recovery of the client data to the second point-in-time (e.g. objects 1 155A, 3 155C, and 4 155D). Accordingly, the system may identify the third set of objects from the second list by determining the third set of objects are not part of the second set of objects (e.g. identify objects 1 and 3, amongst objects 1, 3, and 4). In other words, the system may identify the third set of objects by determining the third set of objects were stored as part of a backup previous to the point-in-time of the recovery.

In 504, the system may determine whether a first expiration time (e.g. 2021-06-15) specified by metadata associated with the third set of objects is prior to a second expiration time (e.g. 2021-06-22) specified by metadata associated with the second set of objects. In some embodiments, the first expiration time specified by the metadata associated with the first set of objects is based on the first point-in-time, and the second expiration time specified by the metadata associated with the second set of objects is based on the second point-in-time.

In 505, the system may update the metadata associated with the third set of objects from the first expiration time to the second expiration time, in response to determining the first expiration time is prior to the second expiration time.

Figure 6:
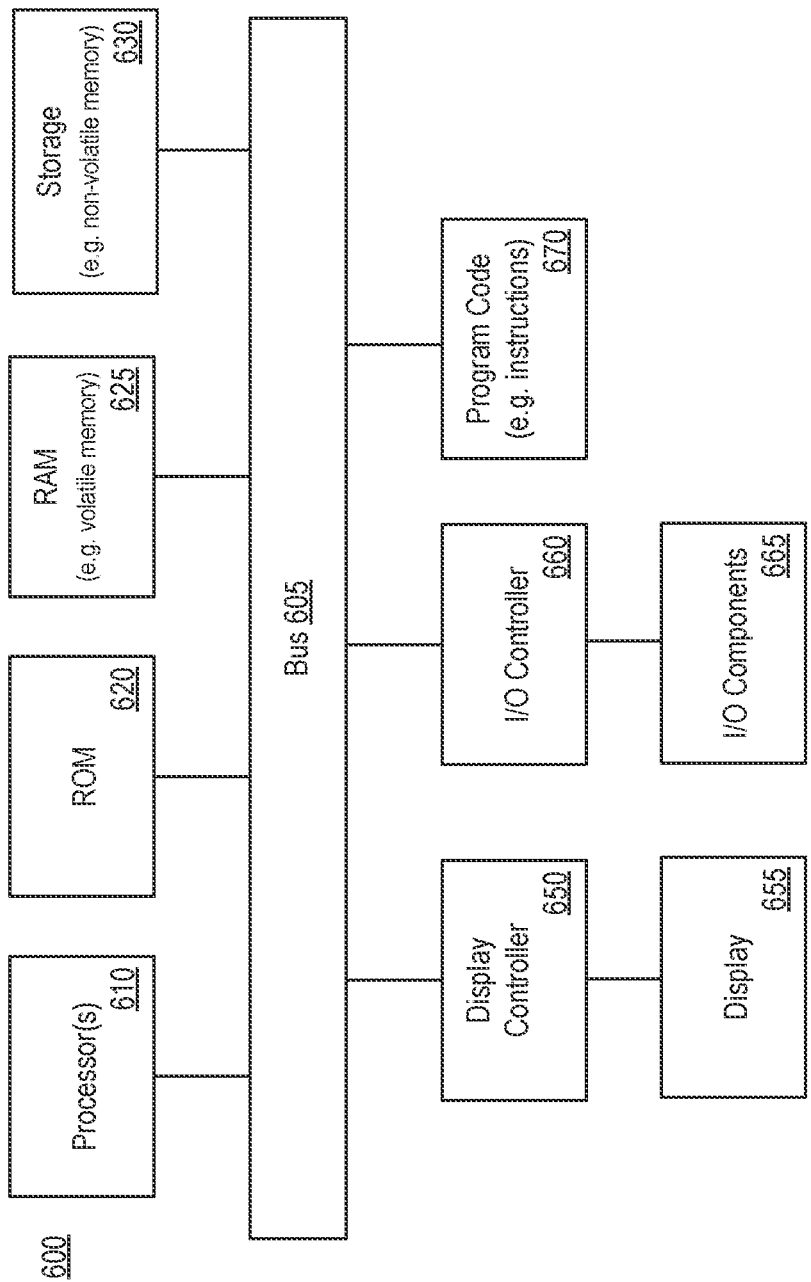
FIG. 6 is a block diagram illustrating a computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems (e.g. server 120, storage system 150, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g. within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g. within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g. accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g. server 120, data manager 175, etc.). Program code 670 may reside, completely or at least partially, within the memories described herein (e.g. non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   perform a first backup of client data stored on a client device at a first point-in-time to a cloud-based object storage, the first backup including storing the client data within a first set of objects on the object storage and storing metadata associated with the first backup in a metadata database, the metadata including an expiration time for each object in the first set of objects and a list of objects required to perform a full recovery to the first point-in-time;
   perform a second backup of the client data stored on the client device at a second point-in-time to the object storage, the client data stored on the client device at the second point-in-time including at least some of the client data already stored within the first set objects and new client data stored on the client device since the first point-in-time, the second backup including storing the new client data within a second set of objects on the object storage and storing metadata associated with the second backup in the metadata database, the metadata including an expiration time for each object in the second set of objects and a list of objects required to perform a full recovery to the second point-in-time;
   identify, amongst the first set of objects, a third set of objects storing at least a portion of the client data stored on the client device at the second point-in-time by comparing the list of objects required to perform a full recovery for a first point-in-time and for a second point-in-time stored in the metadata database, in response to the performance of the second backup;
   determine whether a first expiration time specified by metadata associated the objects identified in the third set of objects is prior to a second expiration time specified by metadata associated with the second set of objects; and
   update the metadata associated with each of the objects identified in the third set of objects from the first expiration time to the second expiration time in the metadata database, in response to determining the first expiration time is prior to the second expiration time.

2. The system of claim 1, wherein the plurality of instructions, when executed, further cause the one or more processors to:
   store, in response to performing the first backup, metadata associated with the first set of objects including the metadata associated with the third set of objects as part of the metadata database on the object storage; and
   store, in response to performing the second backup, the metadata associated with the second set of objects as part of the metadata database.

3. The system of claim 2, wherein the first expiration time specified by the metadata associated with the third set of objects is based on the first point-in-time, and the second expiration time specified by the metadata associated with the second set of objects is based on the second point-in-time.

4. The system of claim 1, wherein the plurality of instructions, when executed, further cause the one or more processors to:
   store, in response to performing the first backup, metadata associated with the first backup including a first list of objects required to perform a full recovery of the client data to the first point-in-time, the first list including the first set of objects; and
   store, in response to performing the second backup, metadata associated with the second backup including a second list of objects required to perform a full recovery of the client data to the second point-in-time, the second list including the second set of objects and the third set of objects.

5. The system of claim 4, wherein the metadata associated with the first backup and the metadata associated with the second backup are stored as part of a backup catalog on the object storage, wherein the metadata database includes a data catalog and the backup catalog.

6. The system of claim 5, wherein identifying, amongst the first set of objects, the third set of objects includes:
   accessing the backup catalog to obtain the second list of objects required to perform the full recovery of the client data to the second point-in-time; and
   identifying the third set of objects from the second list by determining the third set of objects are not part of the second set of objects.

7. The system of claim 1, wherein the first backup includes a full backup of the client data stored on the client device at the first point-in-time, and the second backup includes an incremental backup of the client data stored on the client device from the first point-in-time to the second point-in-time.

8. The system of claim 3, wherein the metadata associated with the first set of objects including the third set of objects, and the metadata associated with the second set objects are stored as part of a data catalog of the metadata database.

9. A method comprising:
   performing a first backup of client data stored on a client device at a first point-in-time to a cloud-based object storage, the first backup including storing the client data within a first set of objects on the object storage and storing metadata associated with the first backup in a metadata database, the metadata including an expiration time for each object in the first set of objects and a list of objects required to perform a full recovery to the first point-in-time;
   performing a second backup of the client data stored on the client device at a second point-in-time to the object storage, the client data stored on the client device at the second point-in-time including at least some of the client data already stored within the first set objects and new client data stored on the client device since the first point-in-time, the second backup including storing the new client data within a second set of objects on the object storage and storing metadata associated with the second backup in the metadata database, the metadata including an expiration time for each object in the second set of objects and a list of objects required to perform a full recovery to the second point-in-time;
   identifying, amongst the first set of objects, a third set of objects storing at least a portion of the client data stored on the client device at the second point-in-time by comparing the list of objects required to perform a full recovery for a first point-in-time and for a second point-in-time stored in the metadata database, in response to the performance of the second backup;
   determining whether a first expiration time specified by metadata associated the objects identified in the third set of objects is prior to a second expiration time specified by metadata associated with the second set of objects; and
   updating the metadata associated with each of the objects identified in the third set of objects from the first expiration time to the second expiration time in the metadata database, in response to determining the first expiration time is prior to the second expiration time.

10. The method of claim 9, further comprising:
    storing, in response to performing the first backup, metadata associated with the first set of objects including the metadata associated with the third set of objects as part of the metadata database on the object storage; and
    storing, in response to performing the second backup, the metadata associated with the second set of objects as part of the metadata database.

11. The method of claim 10, wherein the first expiration time specified by the metadata associated with the third set of objects is based on the first point-in-time, and the second expiration time specified by the metadata associated with the second set of objects is based on the second point-in-time.

12. The method of claim 9, further comprising:
    storing, in response to performing the first backup, metadata associated with the first backup including a first list of objects required to perform a full recovery of the client data to the first point-in-time, the first list including the first set of objects; and
    storing, in response to performing the second backup, metadata associated with the second backup including a second list of objects required to perform a full recovery of the client data to the second point-in-time, the second list including the second set of objects and the third set of objects.

13. The method of claim 12, wherein the metadata associated with the first backup and the metadata associated with the second backup are stored as part of a backup catalog on the object storage, wherein the metadata database includes a backup catalog and a data catalog.

14. The method of claim 13, wherein identifying, amongst the first set of objects, the third set of objects includes:
    accessing the backup catalog to obtain the second list of objects required to perform the full recovery of the client data to the second point-in-time; and
    identifying the third set of objects from the second list by determining the third set of objects are not part of the second set of objects.

15. A computer program product comprising a non-transitory computer-readable medium having a computer-readable program code embodied therein to be executed by one or more processors, the program code including instructions to:
    perform a first backup of client data stored on a client device at a first point-in-time to a cloud-based object storage, the first backup including storing the client data within a first set of objects on the object storage and storing metadata associated with the first backup in a metadata database, the metadata including an expiration time for each object in the first set of objects and a list of objects required to perform a full recovery to the first point-in-time;
    perform a second backup of the client data stored on the client device at a second point-in-time to the object storage, the client data stored on the client device at the second point-in-time including at least some of the client data already stored within the first set objects and new client data stored on the client device since the first point-in-time, the second backup including storing the new client data within a second set of objects on the object storage and storing metadata associated with the second backup in the metadata database, the metadata including an expiration time for each object in the second set of objects and a list of objects required to perform a full recovery to the second point-in-time;
    identify, amongst the first set of objects, a third set of objects storing at least a portion of the client data stored on the client device at the second point-in-time by comparing the list of objects required to perform a full recovery for a first point-in-time and for a second point-in-time stored in the metadata database, in response to the performance of the second backup;

determine whether a first expiration time specified by metadata associated the objects identified in the third set of objects is prior to a second expiration time specified by metadata associated with the second set of objects; and update the metadata associated with each of the objects identified in the third set of objects from the first expiration time to the second expiration time in the metadata database, in response to determining the first expiration time is prior to the second expiration time.

16. The computer program product of claim 15, wherein the program code includes further instructions to:

store, in response to performing the first backup, metadata associated with the first set of objects including the metadata associated with the third set of objects as part of the metadata database on the object storage; and store, in response to performing the second backup, the metadata associated with the second set of objects as part of the metadata database.

17. The computer program product of claim 16, wherein the first expiration time specified by the metadata associated with the third set of objects is based on the first point-in-time, and the second expiration time specified by the metadata associated with the second set of objects is based on the second point-in-time.

18. The computer program product of claim 15, wherein the program code includes further instructions to:

store, in response to performing the first backup, metadata associated with the first backup including a first list of objects required to perform a full recovery of the client data to the first point-in-time, the first list including the first set of objects; and store, in response to performing the second backup, metadata associated with the second backup including a second list of objects required to perform a full recovery of the client data to the second point-in-time, the second list including the second set of objects and the third set of objects.

19. The computer program product of claim 18, wherein the metadata associated with the first backup and the metadata associated with the second backup are stored as part of a backup catalog on the object storage, wherein the metadata database includes the backup catalog and a data catalog.

20. The computer program product of claim 19, wherein identifying, amongst the first set of objects, the third set of objects includes:

accessing the backup catalog to obtain the second list of objects required to perform the full recovery of the client data to the second point-in-time; and identifying the third set of objects from the second list by determining the third set of objects are not part of the second set of objects.

* * * * *